Dec. 31, 1929.  C. GOTTFRIED  1,741,694
ROLL MAKING MACHINE
Filed May 5, 1928  2 Sheets-Sheet 2
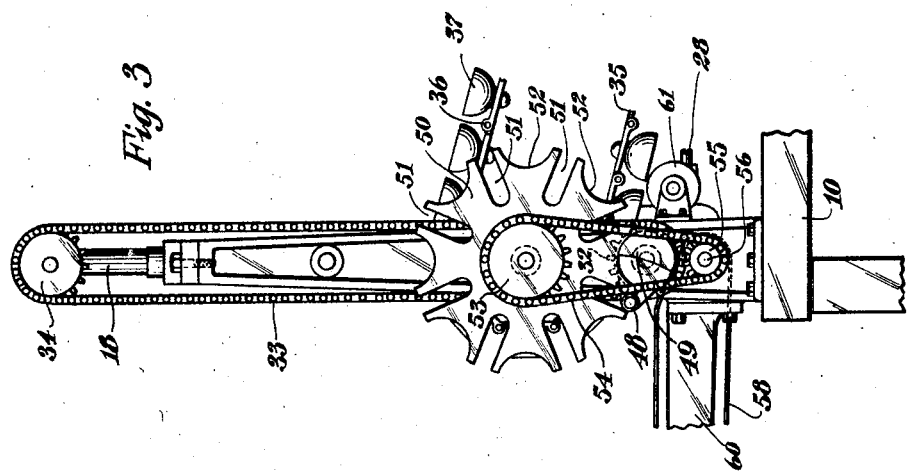
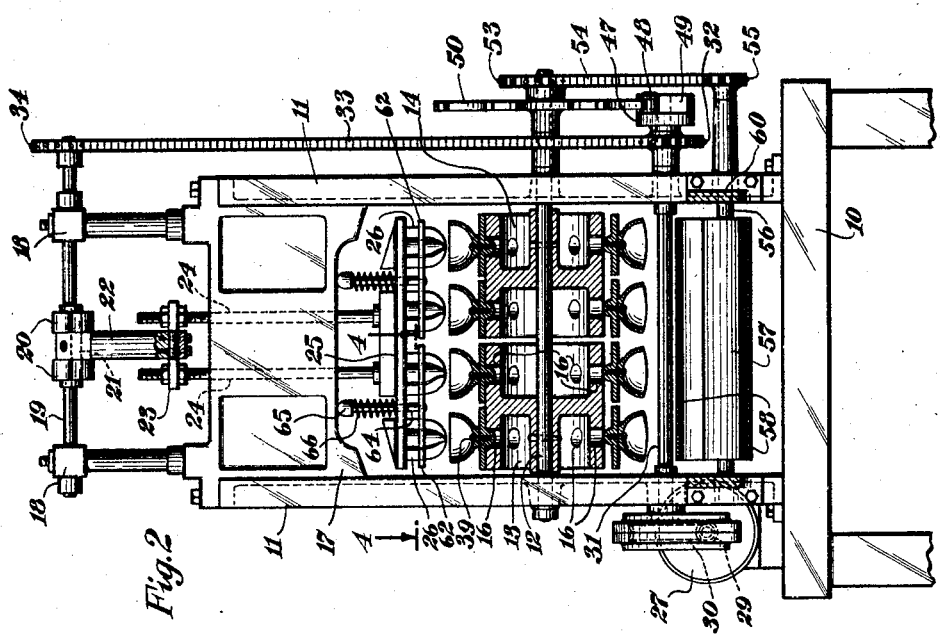
INVENTOR
*Charles Gottfried,*
BY
*Frederick Breitenfeld*
ATTORNEY Patented Dec. 31, 1929

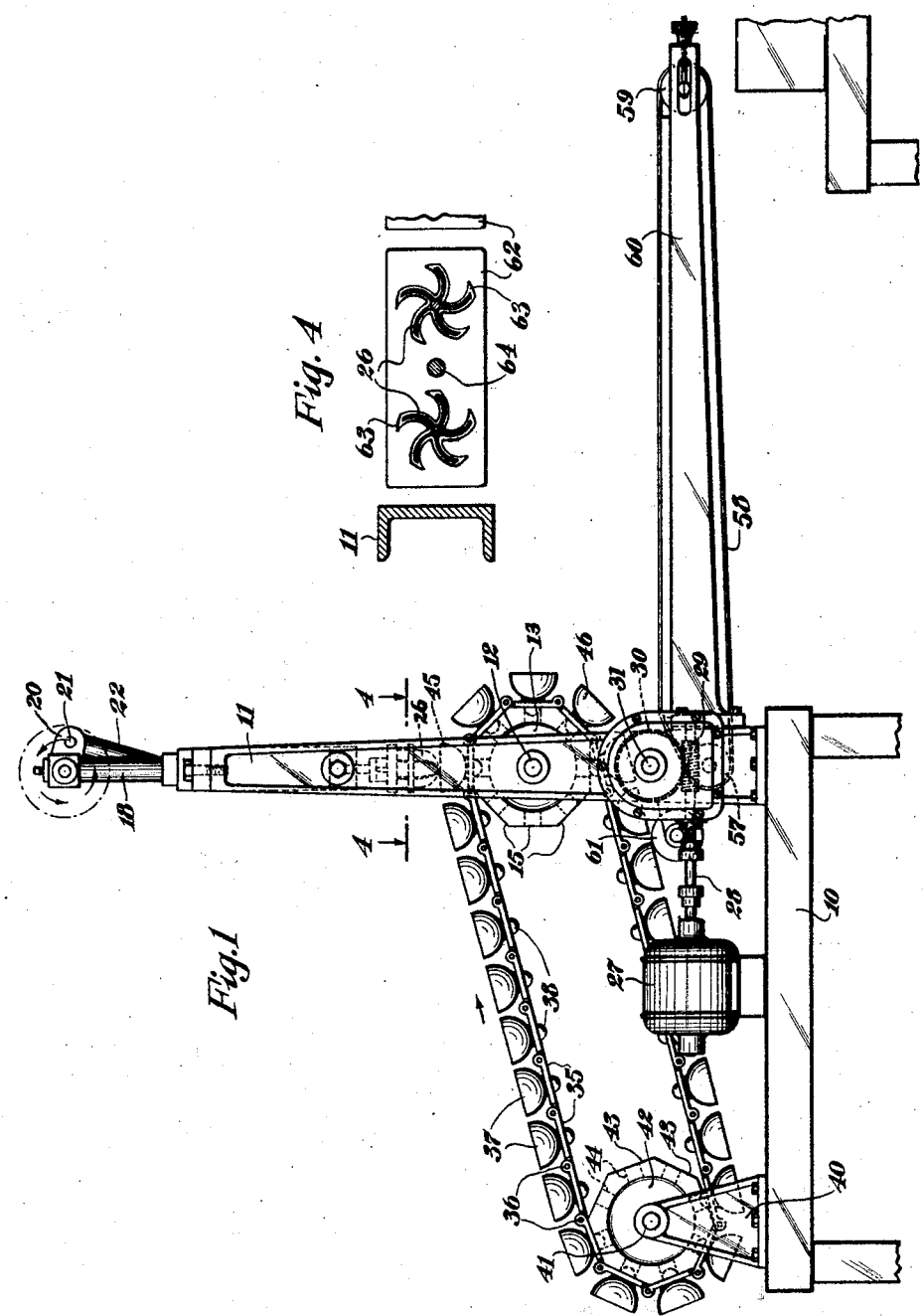

1,741,694

UNITED STATES PATENT OFFICE

CHARLES GOTTFRIED, OF NEW YORK, N. Y., ASSIGNOR TO GOTTFRIED BAKING CO., INC., OF NEW YORK, N. Y., A CORPORATION OF NEW YORK

ROLL-MAKING MACHINE

Application filed May 5, 1928. Serial No. 275,276.

My present invention relates generally to roll-forming machinery and has particular reference to a machine designed for use primarily in the shaping of so-called "Vienna" rolls.

In my previous Patent No. 1,625,649 issued on April 19, 1927, I described a machine which embodied a series of dough-ball cups, a series of dies for cooperation therewith, and means for continuously advancing the cups and the dies in such cooperative manner as to cause the dies successively to enter into successive cups, thereby impaling and shaping the dough-balls therein.

I have found that the continuous movement of cups and dies results in a certain lack of uniformity of finished and shaped dough-balls, and frequently results in unevenly shaping the dough-balls.

It is an object of my present invention to provide a machine of this general character wherein the foregoing disadvantages, and others, are effectually avoided, and whereby dough-balls in large quantities are rapidly, efficiently, and uniformly shaped in an accurate manner.

I have found the best cooperative action between a die and a dough-ball to be one wherein the die moves along a straight line, more particularly, advancing toward and impaling the dough-ball as the latter is held stationary.

It is therefore an object of my present invention to provide a device wherein this advantageous cooperative movement and operation may be efficiently carried out.

One feature of my invention lies in providing at least one die which is reciprocable along a straight line, and more particularly, in a vertical direction; and in providing a fixed abutment beneath the die and coincident with said vertical direction. In combination with the foregoing, I provide means for fixedly supporting a dough-ball cup above the abutment and in the path of downward travel of the die. In this way, the die is enabled to impale the dough-ball in an accurate manner, the pressure being transmitted through the dough-ball and cup downwardly to the fixed abutment.

It is another feature of my invention to employ a series of cups and to provide means for successively fixing said cups in a uniformly accurate position above the abutment and beneath the die.

It is a particular feature of my invention to provide means for securely holding each positioned cup against all lateral movement after it has been properly located in the same accurate predetermined position. In the embodiment herein illustrated and described, I provide a movable member having a series of peripheral supporting portions, means for accurately bringing these supporting portions successively into accurately proper position above the abutment, and means provided on each supporting portion for positively engaging the supported cup to hold it in such position.

More particularly, it is a feature of my invention to provide a polygonal wheel whereof the peripheral faces are designed to serve as the supporting portions mentioned above; and in combination with such a wheel I provide means for alternately rotating the same through a predetermined distance and then securing the same against rotation. For this purpose, it is a feature of my invention to provide a Geneva movement which efficiently cooperates with the other elements of my machine to effect the desirable operation above outlined. It is another feature of my invention to provide the cups in a mutually linked manner, whereby the intermittent rotation or movement of the supporting member or wheel will serve at the same time to effect the desired movement of the cups successively into the operative position.

Another feature of my invention lies in so constructing the constituent parts of my machine that the attendance thereof and the operation thereof are greatly facilitated. More particularly, I provide a feeding position and a discharge position; I arrange and construct the parts in such a manner that the actual shaping of the dough-balls is accomplished closely adjacent to the discharge position; and I provide a conveyor in such a manner as to efficiently permit an automatic discharge of the shaped dough-balls onto this conveyor and thence to any desired point.

In accordance with the foregoing automatic discharge arrangement, I provide means for automatically stripping from the die or dies any dough-ball which may have become impaled thereon, this stripping arrangement serving to discharge the impaled dough-ball from the die during the upward movement of the latter and thereby assuring the proper discharge of the shaped dough-balls in succession onto the conveyor.

For the attainment of the foregoing objects and such other objects as may hereinafter appear or be pointed out, I have constructed a device embodying the features of my invention and illustrated in the accompanying drawings, in which—

Figure 1 is a side elevational view of a machine embodying the features of my present invention;

Figure 2 is an end view thereof taken from the right of Figure 1, and certain elements being shown in cross-section;

Figure 3 is an end view taken from the right of Figure 2; and

Figure 4 is a cross-sectional plan view taken substantially along the line 4—4 of Figures 1 and 2.

My machine may be mounted upon a suitable table 10 and comprises a vertical pair of stanchions 11 between which a horizontally arranged shaft 12 is mounted. A pair of polygonal wheels 13 and 14 are mounted upon this shaft 12 for rotation therewith These wheels are symmetrical with respect to one another and a description of one will serve as a description of the other. The polygonal structure provides a series of peripheral supporting faces 15, each of which is provided with a pair of recesses 16. The wheels 13 and 14 are alternately rotated and secured against rotation in a manner more fully to be described hereinafter and which successively positions the faces 15 in a horizontal plane overlying the shaft 12.

Toward the upper end of the stanchions 11 is a supporting framework 17 extending therebetween, a pair of horizontally aligned bearings 18 being provided a slight distance above the top of the structure 17. A shaft 19 is mounted between the bearings 18 and is provided at its medial portion with a pair of cranks 20. A pin 21 extends between the outer ends of the cranks 20, and a connecting rod or pitman 22 is mounted upon the pin 21. The free end of the connecting rod 22 is pivotally associated with the upper portion 23 of a vertically reciprocable structure which includes the spaced vertical rods 24 and the transverse plate 25 carried by the lower ends of the rods 24.

Depending from the plate 25 are a series of suitably configured dies 26 adapted to advance toward and retract from the horizontally positioned faces 15 of the wheels 13 and 14.

The shaft 19 is constantly rotated at a predetermined uniform rate of speed by means of suitable transmission from a motor 27. The latter may be mounted upon the table 10 and its shaft 28 may be provided with a worm 29, the latter engaging a gear wheel 30 mounted for rotation about a horizontal axis. The wheel 30 is mounted upon a shaft 31 which extends between the stanchions 11 and beneath the wheels 13 and 14. At the opposite end of the shaft 31, a sprocket wheel 32 is mounted, and a chain 33 extends upwardly from this sprocket wheel to a corresponding sprocket wheel 34 mounted upon the end of the shaft 19.

I have shown a series of dough-ball cups constructed and arranged to constitute four endless chains. One of these chains is clearly disclosed in Figure 1, and a description of this chain will suffice as a description of all. A set of flat plates 35 are linked to one another as by means of hinges 36. On each plate a substantially hemispherical cup 37 is rigidly mounted. More particularly, I provide a downwardly extending projection or boss 38 upon each plate 35, internally threading the latter and causing a suitable bolt 39 to extend from the bottom of each cup downwardly into the boss 38. Where desired, the boss 38 may be replaced by an ordinary nut or the like.

Spaced from the stanchions 11 but similarly arranged are a pair of shorter stanchions 40 between which a horizontally extending shaft 41 extends. Upon the shaft 41 I mount one or more polygonally shaped wheels 42 substantially similar to the wheels 13 and 14. The wheel 42 of Figure 1 comprises a series of peripheral flat faces 43 each of which has one or more recesses 44 similar to the recesses 16.

The plates or links 35 are so constructed and sized as to permit the chain formed thereby to extend around the wheel 42 and around the corresponding wheel 13 or 14 on the other shaft. It will be observed that each plate 35 closely overlies one of the faces 43, and that the depending boss or projection 38 enters the corresponding recesses 44.

By mechanism presently to be described, a clockwise intermittent rotation is imparted to the shaft 12. The engagement between the recesses 16 and the bosses 38 will thereby tend to move the entire endless chain in a step by step manner which advances the cups step by step and right side up from the wheel or wheels 42 to the wheels 13 and 14.

The left-hand end of the machine illustrated in Figure 1 is the feeding end, and an operator places unshaped dough-balls into the cups 37 as they are about to commence their travel toward the stanchions 11. As each cup 37 is positively engaged by one of the recesses 16, it is positively advanced into the operative position occupied by the cup 45 in Figure 1. All of the cups will uniformly and successively occupy this same accurately predetermined position. This position is one wherein the center of the cup is accurately aligned with the vertical direction of reciprocation of the corresponding die 26, it being remembered that this vertical direction is coincident with the abutment provided by the bearing of the shaft 12. After the cup has been fixed in this position for a predetermined period of time, the engagement thereof by the wheel beneath it and the subsequent rotation of the wheel will cause the cup gradually to assume the inverted position occupied by the cup 46 of Figure 1. In this inverted position, the cups are caused to travel back toward the wheel 42.

The Geneva movement previously referred to comprises the rotatable element 47 mounted upon the end of the shaft 31, this element being provided with a pin 48 eccentric with respect to the axis of the shaft 31, and a rounded portion 49 concentric with respect to said axis. Engaging the element 47 is a wheel 50 mounted upon the end of the shaft 12. This wheel comprises a series of spaced radial recesses 51, and between the latter, a series of concaved recesses 52. The recesses 52 are constructed to be concentric with the axis of the shaft 31 at the time that they overlie the latter.

As the shaft 31 is continuously rotated by means of the motor 27, there is an alternate engagement between the pin 48 and a recess 51, and the rounded portion 49 and a recess 52. During that portion of the rotation of the shaft 31 when the rounded portion 49 engages with a recess 52, the wheel 50 and the shaft 12 are secured against any rotation in either direction. As the rounded portion 49 rides off of the recess 52, the pin 48 enters the next recess 51 and this engagement imparts to the wheel 50 a slight predetermined rotation.

Mounted upon the end of the shaft 12 I have also provided a sprocket wheel 53 transmitting the movement of the shaft 12 by means of a chain 54 to a sprocket wheel 55 mounted upon a shaft 56. The latter shaft carries a roller 57 upon which an endless conveyor 58 is mounted, the other end of the conveyor 58 being mounted upon a pulley or wheel 59. The wheel 59 is adjustably mounted at the extreme end of a horizontally extending supporting structure 60 leading away from the machine.

I also prefer to provide an idler roller 61 between the stanchions 11 and slightly to the rear thereof, this roller serving to prevent the inverted cups from drooping too far by virtue of their own weight.

Before describing the operation of my device, I will point out that a pair of stripping plates 62 are associated with the dies 26. Each stripping plate 62 has slots or apertures 63 therein as shown most clearly in Figure 4, these slots conforming to the blades of the dies 26 and permitting the dies to reciprocate freely through the plates 62. Each plate 62 is mounted upon a vertical rod 64 extending upwardly through the plate 25 and terminating at its upper end in an abutment member 65. Between the abutment member 65 and the plate 25 I provide a compression spring 66.

When the device is operated, the dies 26 reciprocate vertically in a continuous manner because of the continuous rotation of the shaft 19. It may be pointed out that this direction of vertical reciprocation is accurately radial with respect to the axis of the shaft 12. While the dies 26 are moving upwardly, the pin 48 is engaging one of the recesses 51 and is imparting a slight rotation to the shaft 12 and the polygonal wheels mounted thereon. Where two polygonal wheels are employed as in the illustrated embodiment, and where each wheel supports and actuates two endless chains of cups, this small rotation of the shaft 12 will accurately position four cups in the path of downward travel of the four dies 26. On the downward movement of the dies 26, the cups will be secured against any lateral or other movement by virtue of the combined effect of (a) the engagement between the bosses 38 and the recesses 16, and (b) the engagement between the rounded portion 49 and one of the recesses 52. As a result, each die will accurately enter and impale the dough-ball in the cup positioned thereunder. The shaping action will be of a predetermined uniform character because of the fact that the cup is retained stationary and because of the fact that the downward pressure of each die will be counterbalanced by the fixed and rigid abutment constituted by the bearings of the shaft 12.

As the dies 26 withdraw from the cups 37, most of the shaped dough-balls will remain within the cups. Should any thereof remain impaled upon the dies 26, they will be almost immediately stripped therefrom and forced back into the cups beneath by means of the stripping plates 62. The latter function during the upward movement of the dies 26 by virtue of the fact that the abutment members 65 encounter the under-surface of the structure 17 and yieldably cause a relative movement of the strippers 62 downwardly with respect to the upwardly moving dies 26.

It is also to be noted that upon continued intermittent rotation of the shaft 12, the gradual inversion of the cups 37 will result in having the shaped dough-balls discharged automatically onto the conveyor 58. The latter has an intermittent movement transmitted thereto through the chain 54 and carries the shaped dough-balls to an operator or attendant standing adjacent to the extreme outer end of the conveyor 58. The intermittent movement of the conveyor 58 avoids unnecessary delay at the receiving end, no portion of the conveyor 58 being unused at any time.

It will be obvious that certain phases of my invention do not require details of construction as illustrated and described herein. For example, the stripping plates 62 may be formed of one piece; or they may be rigidly supported between the stanchions 11. The latter construction would probably present greater difficulties from the standpoint of assembly and disassembly in case of repair. Similarly, it will be obvious that the number of endless cup chains may be varied to suit requirements. In the illustrated embodiment, I have shown four such chains. Also, the wheels 13 and 14 may be made integral with one another, or one single wheel may be employed as in my previously disclosed device.

In general, it will be obvious that many changes in the details herein described and illustrated for the purpose of explaining the nature of my invention may be made by those skilled in the art without departing from the spirit and scope of the invention as expressed in the appended claim. It is therefore intended that these details be interpreted as illustrative, and not in a limiting sense.

Having thus described my invention and illustrated its use, what I claim as new and desire to secure by Letters Patent is—

In a roll-forming machine, an upright frame, a set of bearings in said frame, a shaft rotatably mounted in said bearings, an endless conveyor, a series of outwardly disposed dough-ball cups carried thereby, a pair of horizontally spaced wheels around which the conveyor extends, one of said wheels being mounted on said shaft, means for intermittently driving said shaft to advance the cups step by step and right side up toward said wheel mounted on said shaft, a set of bearings on said frame above said first mentioned bearings, a shaft rotatably mounted therein and over said first mentioned shaft, a crank on said second mentioned shaft, a reciprocable die between said shafts, a connecting rod connecting said crank with said die, and means to rotate said second mentioned shaft continuously.

In witness whereof I have signed and sealed this specification this 20 day of April, 1928.

CHARLES GOTTFRIED.